United States Patent [19]

Kundrat

[11] Patent Number: 5,749,939
[45] Date of Patent: May 12, 1998

[54] MELTING OF NI LATERITE IN MAKING NI ALLOYED IRON OR STEEL

[75] Inventor: David M. Kundrat, Cincinnati, Ohio

[73] Assignee: Armco Inc., Middletown, Ohio

[21] Appl. No.: 760,363

[22] Filed: Dec. 4, 1996

[51] Int. Cl.[6] ................................................ C21C 5/00
[52] U.S. Cl. .................. 75/560; 75/560; 75/507; 75/416; 75/414; 75/501; 75/540; 75/546; 75/547; 420/34; 420/43; 420/50; 420/55; 420/62
[58] Field of Search ..................... 75/560, 507, 416, 75/414, 501, 540, 546, 547; 420/34, 43, 50, 55, 62

[56] References Cited

U.S. PATENT DOCUMENTS

| | | | |
|---|---|---|---|
| 3,847,601 | 11/1974 | Itoh et al. | 75/130.5 |
| 4,001,012 | 1/1977 | Rote et al. | 75/51 |
| 5,039,480 | 8/1991 | Tanabe et al. | 420/588 |
| 5,047,082 | 9/1991 | Tanabe et al. | 75/629 |
| 5,575,829 | 11/1996 | Kundrat | 75/10.35 |

*Primary Examiner*—David A. Simmons
*Assistant Examiner*—M. Alexandria Elve
*Attorney, Agent, or Firm*—R. J. Bunyard; L. A. Fillnow

[57] ABSTRACT

A multiple stage process for obtaining Ni units from Ni laterite ores and sulfur-bearing Ni concentrates during production of nickel-alloyed iron, nickel-alloyed steel or nickel-alloyed stainless steel in a reactor equipped with top- and bottom-blowing means. Dried Ni laterite ore is charged into an iron/slag bath mixture containing dissolved carbon and a metalloid reductant such as aluminum or silicon. The laterite ore is melted while heat is generated by oxidation of the metalloid and carbon in the reactor. After the laterite ore is melted, top-blowing of pure oxygen and bottom-blowing of an oxygen-containing gas are ceased. Bottom injection of an inert stirring gas is begun. A sulfur-bearing Ni concentrate and aluminum are added to the bath. Sulfur from the sulfur-bearing Ni concentrate is transferred to and held within the slag produced from the laterite ore by controlling slag composition and temperature, degree of mixing of the iron/slag bath mixture by the inert gas and the carbon/metalloid concentration in the bath mixture. The sulfur-containing slag then is discharged from the reactor and the iron bath mixture is decarburized and refined to alloy specification. The extent of desulfurization by the slag determines the amount of sulfur-bearing Ni concentrate that can be added to the bath for a given slag weight. Total slag weight throughout the process should be within the range of 200 to 300 kg slag/MT bath mixture, the temperature of the bath should be maintained between 1500°–1700° C., the slag basicity should be controlled between 1–3 and the compositions of $Al_2O_3$ and MgO in the slag should be maintained between 10–25 wt. % and 10–20 wt. % respectively.

31 Claims, No Drawings

MELTING OF NI LATERITE IN MAKING NI ALLOYED IRON OR STEEL

BACKGROUND OF THE INVENTION

This invention relates to a process for manufacturing a nickel-alloyed ferrous bath in a refining reactor. More particularly, at least some of the Ni units in the nickel-alloyed ferrous bath are obtained by the addition of Ni laterite ore to an iron/slag bath mixture containing a dissolved metalloid reductant and a carbon reductant. The process can be cost-effective in recovering Ni units from melting Ni laterite ore when the bath mixture is vigorously stirred under reducing conditions sustained by the metalloid reductant.

Ni units contained in scrap are priced about 80% of that of Ni units in ferronickel. Both sources of Ni units constitute the most expensive material for making nickel-alloyed stainless steel. Ni units in ferronickel or Ni shot are expensive owing to high production costs of liberating nickel from ore generally containing less than 3 wt. % Ni. Ni ores are of two generic types, sulfides and laterites. In sulfur-containing ores, nickel is present mainly as the mineral pentlandite, a nickel-iron sulfide that may also be accompanied with pyrrhotite and chalcopyrite. Sulfur-containing ores typically contain 1–3 wt. % Ni and varying amounts of Cu and Co. Crushing, grinding, and froth flotation are used to concentrate the valuable metals and discard as much gangue as possible. Thereafter, selective flotation and magnetic separation can be used to divide the concentrate into nickel-, copper-, and iron-rich fractions for further treatment in a pyrometallurgical process. Further concentration of nickel can be obtained by subjecting the concentrate to a roasting process to eliminate up to half of the sulfur while oxidizing iron. The concentrate is melted at 1200° C. to produce a matte consisting of Ni, Fe, Cu, and S, and the slag is discarded. The matte can be placed in a converter and blown with air to further oxidize iron and sulfur. Upon cooling of the matte, distinct crystals of Ni—Fe sulfide and copper sulfide precipitate separately according to the dictates of the Fe—Cu—Ni—S phase diagram. After crushing and grinding, the sulfide fraction containing the two crystals is separated into copper sulfide and Ni—Fe sulfide concentrates by froth flotation. The Ni—Fe sulfide concentrate undergoes several more energy-intensive stages in route to producing ferronickel and Ni shot. The Ni—Fe sulfide can be converted to granular Ni—Fe oxide sinter in a fluidized bed from which a Ni cathode is produced by electrolysis. Alternatively, Ni—Fe concentrates can undergo a conversion to Ni and Fe carbonyls in a chlorination process to decompose into nickel and iron powders.

Ni laterite ore is formed by the weathering of nickelferrous rock. Upon weathering, nickel and iron from the rock are dissolved by descending water only to be redeposited in lower zones. The zones sufficiently enriched in nickel by this process are mined as Ni ore. These ores contain as much as 30% $H_2O$, both chemically bound and free. The nickel and iron are chemically bound with water and may occur as nickelferrous goethite (Fe, NiOOH), averaging 0.8 to 1.5% Ni, or as a hydrous nickel-magnesium silicate (garnierite), having a Ni content of 1.8 to 3.5%. These ores can contain up to 0.2% Co that was absorbed along with Ni and Fe by the meteoric water.

It is known to produce stainless steel by charging partially dried, nickel-bearing laterite ore directly into a refining vessel having a top-blown oxygen lance and bottom tuyeres for blowing a stirring gas. Such ores contain at most 3% Ni, with over 80% of the dry ore weight converting to slag. U.S. Pat. No. 5,047,082 discloses producing stainless steel in an oxygen converter using a low-sulfur nickel-bearing ore instead of ferronickel to obtain the needed Ni units. The Ni ore is reduced by carbon dissolved in molten iron and char present in the slag. U.S. Pat. No. 5,039,480 discloses producing stainless steel in a converter by sequentially melting and reducing a nickel-bearing ore and then a chromite ore. The ores are reduced by carbon dissolved in an iron bath. After the Ni ore has been melted and reduced, slag is removed from the converter for dephosphorization and desulfurization of the iron bath before the chromite ore is added to the iron bath.

Because laterite ore contains little sulfur, the bulk of Ni units for making stainless steel can come from this type of ore. However, the large quantity of slag accompanying the Ni units necessitates a separate, energy-intensive melting step in addition to the refining step, requiring increased processing time and possibly a separate reactor.

Control of bath sulfur content is one of the oldest and broadest concerns during refining of iron. Ever since iron was smelted in the early blast furnaces, it was known that slag in contact with molten iron offered a means for removing some of the sulfur originating from coke used as fuel. More recently, key factors identified for sulfur removal during refining include controlling slag basicity as a function of partial pressures of gaseous oxygen of the slag and slag temperature.

U.S. Pat. No. 5,575,829, incorporated herein by reference, teaches the art of obtaining Ni units for nickel-alloyed steels by the addition of sulfur-bearing Ni concentrates to an iron bath following the reduction period during refining. For a given slag sulfur solubility and alloy sulfur specification, the number of Ni units that can be obtained in this manner is dependent upon the slag weight available per slag and the number of subsequent slags.

Nevertheless, the slag sulfur solubility limit normally is not reached during routine refining of stainless steel alloyed with nickel because the total sulfur load in the refining vessel originating from melting the solid charge material in an electric arc furnace is low. Hence, slag desulfurization capacity in the refining vessel can be under-utilized. Increased slag weight, the presence of residual reductants in the bath and the manipulation of slag composition can all increase this degree of under-utilization. Adding more slags extends the cycle time to produce an alloy, but this can adversely impact production costs, especially when the refining state is the productivity in a steel manufacturing plant. Enlarging the smelting reactor enables a higher slag weight to be accommodated per slag, but this entails increased capital expenditure.

Accordingly, there remains a long felt need to obtain additional Ni units directly from Ni ores and concentrates without the need for sequential slags or major capital expenditure, thereby lowering further the cost of Ni alloying units used in the manufacture of nickel-alloyed iron or nickel-alloyed steels such as low carbon steel, ferritic stainless steel, duplex stainless steel and austenitic stainless steel. There remains a further need to better utilize the desulfurization capacity of a refining vessel when manufacturing nickel-alloyed iron and nickel-alloyed steel by obtaining the Ni units directly from Ni ores and concentrates.

BRIEF SUMMARY OF THE INVENTION

This invention relates to a process for manufacturing a nickel-alloyed ferrous bath by deriving at least some of the Ni alloying units of the ferrous bath by melting Ni laterite ore in an iron/slag bath mixture containing a dissolved metalloid reductant and a carbon reductant in a refining reactor. The process can economically recover Ni units when melting Ni laterite ore when the bath mixture is vigorously stirred and heat is supplied in part by oxidation of the metalloid and carbon reductants by injected oxygen. In a preferred embodiment, this oxidation step is followed by a reduction step, wherein a sulfur-bearing Ni concentrate is added to the ferrous bath with sulfur transfered to the slag. Substantially more Ni units are procured per slag than if just melting Ni laterite ore followed by refining into the nickel-alloyed ferrous bath, or by the addition of a sulfur-bearing Ni concentrate alone, following a reduction step during refining.

A principal object of the invention is to-provide inexpensive Ni units directly from Ni laterite ore during the manufacture of a nickel-alloyed iron, nickel-alloyed steel and nickel-alloyed stainless steel.

Another object of the invention is to provide inexpensive Ni units directly from Ni laterite ore and sulfur-bearing Ni concentrate during the manufacture of a nickel-alloyed iron, nickel-alloyed steel and nickel-alloyed stainless steel.

Another object of the invention is to exploit the under-utilization of the desulfurization capacity of the slag formed during melting Ni laterite ore by the direct addition of sulfur-bearing Ni concentrate during the manufacture of a nickel-alloyed iron, nickel-alloyed steel and nickel-alloyed stainless steel.

Another object of the invention is to provide an inexpensive method of producing a low-sulfur-containing nickel-alloyed steel and nickel-alloyed stainless steel directly from Ni laterite ore and a sulfur-bearing Ni concentrate.

Another object of the invention is to provide an inexpensive method of producing a nickel-alloyed stainless steel directly from Ni laterite ore, wherein oxidation loss of chromium to the slag is minimized.

Another object of the invention is to provide an inexpensive method of producing a low-sulfur-containing nickel-alloyed stainless steel directly from Ni laterite ore and sulfur-bearing Ni concentrate, wherein oxidation loss of chromium to the slag is minimized.

This invention is a process for manufacturing a nickel-alloyed ferrous bath in a refining reactor containing an iron/slag bath mixture having a dissolved metalloid reductant and a carbon reductant. The process steps include charging a Ni laterite ore into the bath mixture, injecting an oxygen-containing gas into the reactor to oxidize the metalloid and the carbon and to vigorously stir the bath mixture until the Ni laterite ore is melted thereby forming a nickel-alloyed ferrous bath. Heat is supplied in part by oxidation of the metalloid and carbon reductants by the injected oxygen. After slag is discharged from the ferrous bath, injection of the oxygen-containing gas may be continued, if necessary, until the ferrous bath is decarburized to a final carbon specification.

Another feature of the invention includes the additional step of drying the Ni laterite ore to contain no more than 10 wt. % chemically bound water before charging the ore into the reactor.

Another feature of the invention includes the additional step of pre-heating the Ni laterite ore.

Another feature of the invention is for the aforesaid reactor to include means for stirring the bath mixture.

Another feature of the invention is for the aforesaid reactor to include means for top-blowing of oxygen and the additional step of passing oxygen gas through the blowing means into the reactor, a portion of the oxygen gas being discharged above or into the bath mixture to effect post-combustion of CO and $H_2$ and the remainder of the oxygen gas being injected into the bath mixture to effect oxidation of carbon to CO and the metalloid to oxide.

Another feature of the invention is for 30 to 100% of the total gas flowing into the aforesaid reactor to pass through the stirring means.

Another feature of the invention is for the total specific flow of oxygen gas passing through the blowing means and oxygen-containing gas passing through the stirring means being 0.5 to 4 $NM^3$/min/MT.

Another feature of the invention is for the post-combustion degree of CO and $H_2$ being less than 50%.

Another feature of the invention includes the oxygen gas passing through the blowing means being essentially pure oxygen and the gas injected through the stirring means having an oxygen to inert molar gas ratio of no greater than 4.

Another feature of the invention includes the molar ratio of oxygen to inert gas in the stirring gas being decreased to zero after the Ni laterite ore is melted.

Another feature of the invention is for the aforesaid bath mixture to contain 0 to 20 wt. % Cr, 0.5 wt. % C up to carbon saturation and up to 3 wt. % of the metalloid.

Another feature of the invention is for the slag basicity to be maintained between 1.0–3.0.

Another feature of the invention is for the slag weight in the bath mixture not to exceed 400 kg/MT.

Another feature of the invention includes the additional step of adding a sulfur-bearing Ni concentrate and another metalloid to the ferrous bath.

Another feature of the invention includes an inert gas being passed through the aforesaid stirring means to vigorously mix the bath mixture until the sulfur-bearing Ni concentrate is completely melted and sulfur is transfered to the slag by reducing conditions sustained by the additional metalloid added into the ferrous bath.

Another feature of the invention includes the aforesaid sulfur-bearing Ni concentrate being pre-heated and charged simultaneously with the Ni laterite ore.

Another feature of the invention includes the aforesaid sulfur-bearing Ni concentrate containing 5–25 wt. % S and 10–35 wt. % Ni.

Another feature of the invention includes at least 10% of the Ni units in the nickel-alloyed iron bath being derived from the Ni laterite ore and the sulfur-bearing Ni concentrate.

Another feature of the invention is for the aforesaid nickel-alloyed bath being a stainless steel containing ≦2.0 wt. % Al, ≦2.0 wt. % Si, ≦0.03 wt. % S, ≦26 wt. % Cr, and ≦10 wt. % Ni.

An advantage of the invention is to provide a process for providing inexpensive Ni alloying units during the manufacture of nickel-alloyed iron, nickel-alloyed steel and nickel-alloyed stainless steel.

Another advantage of the invention is for the large slag volume from melting Ni laterite ore to serve as a reservoir for holding sulfur from melting a sulfur-bearing Ni concentrate when a ferrous bath is vigorously mixed under reducing conditions sustained by a metalloid reductant so that sulfur removal from the bath to the slag is maximized.

Another advantage of the invention is to provide a nickel-alloyed stainless steel manufactured directly from a Ni laterite ore, wherein oxidation loss of chromium during desulfurization of the iron/slag mixture to the slag is minimized.

Another advantage of the invention is to provide a nickel-alloyed, low-sulfur stainless steel with the steel manufactured by melting Ni laterite ore and sulfur-bearing Ni concentrate in a ferrous bath.

Another advantage of the invention is for producing a low-sulfur-containing nickel-alloyed stainless steel directly from Ni laterite ore and sulfur-bearing Ni concentrate, wherein oxidation loss of chromium to the slag is minimized.

DETAILED DESCRIPTION OF THE PREFERRED EMBODIMENT

The present invention relates to using inexpensive sources of nickel for producing a nickel-alloyed ferrous bath when manufacturing iron, steel or stainless steel in a refining reactor. The invention is a process for producing the nickel-alloyed ferrous bath to specification, wherein at least a portion of the Ni alloying units are derived from Ni laterite ore. In a preferred embodiment, the invention is a process for producing the nickel-alloyed ferrous bath, wherein at least a portion of the Ni alloying units are derived from Ni laterite ore and a sulfur-bearing Ni concentrate, wherein the Ni laterite ore and the sulfur-bearing Ni concentrate may be added to an iron/slag bath mixture separately or simultaneously. In a more preferred embodiment, the invention is a multiple step process for producing the nickel-alloyed ferrous bath, wherein at least a portion of the Ni alloying units are derived from Ni laterite ore added initially to the iron/slag bath mixture and then sequentially followed by adding the sulfur-bearing Ni concentrate to the nickel-alloyed ferrous bath.

The nickel content and the composition of the accompanying slag constituents of Ni laterite ores depend upon their source. Raw Ni laterite ores have in common a Ni content generally below 3 wt. % and a Cr content above 0.5 wt. %, a sizable Fe content, and up to 30 wt. % $H_2O$. A Ni laterite concentrate may have a Ni content well above 3 wt. %. By Ni laterite ore of the invention, it will be understood to include raw Ni laterite ores and concentrates made from Ni laterite ore. The Ni laterite ores and ore concentrates of the invention preferably contain at least 1 wt. % Ni, the balance being $Fe_2O_3$, $Fe(OH_2)$, $SiO_2$, MgO and $Al_2O_3$. Table I lists six examples of unconcentrated ore analyses. These analyses show generally $SiO_2$ and MgO to be in abundance, but $Al_2O_3$ to be in a much smaller quantity, and CaO to be practically non-existent.

TABLE I

| Ore | % Ni | % Fe | % Cr | % Co | % $SiO_2$ | % MgO | % $Al_2O_3$ | % CaO | LOI* |
|-----|------|------|------|------|-----------|-------|-------------|-------|------|
| A | 2.5 | 14.1 | 0.7 | 0.08 | 36.6 | 25.4 | 1.3 | 0.4 | 17 |
| B | 2.5 | 13.2 | 0.6 | — | 35.2 | 25.9 | 1.1 | — | — |
| C | 1.9 | 14.1 | — | — | 40.5 | 9.4 | 4.7 | 0.5 | — |
| D | 1.7 | 15.8 | — | — | 30.1 | 20.3 | 4.5 | 0.6 | — |
| E | 1.5 | 34.7 | 1.8 | 0.16 | 21.3 | 5.1 | 6.4 | 0.2 | 13 |
| F | 1.2 | 52.3 | 1.4 | 0.07 | 2.8 | 0.5 | 3.0 | 0.1 | 13 |

*Loss on ignition @ 1000° C.

An advantage of the present invention is to provide on economical process for making stainless steels in a refining reactor using less expensive Ni ores and concentrates substituting in part for relatively more expensive ferronickel and stainless scrap containing nickel. More specifically, partially-dried, pre-heated Ni laterite ore is melted in an iron/slag bath mixture containing a metalloid reductant and a carbon reductant, preferably followed by charging a sulfur-bearing Ni concentrate and desulfurization of the ferrous bath, which is then refined directly to stainless steel in the same reactor. The process of the invention is such as to be economically implemented in an existing stainless steel melt shop having a refining reactor such as an Argon-Oxygen Decarburizer (AOD), a Vacuum-Oxygen-Decarburizer (VOD), or a Creusot-Loire-Uddeholm (CLU) converter. The reactor may be retro-fitted with means such as a lance for top-blowing of an oxygen containing gas in a Q-BOP, an AOD, VOD or CLU, or having installed a generic Top-and-Bottom-blowing-Refining-Reactor (TBRR), which include a Klockner Maxhutte Stahlerzeugungsverfahren (KMS-S) top and bottom blowing stainless steel converter or a Klockner Oxygen Boden or Brotzmann Maxhutte bottom blowing stainless steel converter (K-OBM-S). Regardless of the type of refining reactor, it will be equipped with means such as one or more of a bottom tuyere, a porous plug, concentric pipes, and the like, hereafter referred to as a tuyere, for passing an inert gas into the bath mixture contained within the refining reactor during the desulfurization stage. Inert stirring gases of the invention include Ar, $N_2$, or mixtures thereof, with Ar being preferred.

To capitalizes on the presence of a large amount of slag formed when melting Ni laterite ore, sulfur-bearing Ni concentrates can advantageously be melted to utilize the large slag volume as a reservoir for transferring and holding bath sulfur when the iron/slag bath mixture is vigorously mixed under reducing conditions sustained by a metalloid reductant dissolved in the iron/slag bath mixture. For example, the sulfur-bearing Ni concentrate can advantageously be melted to utilize the slag volume to receive and hold sulfur when the iron/slag bath mixture and sulfur-bearing Ni concentrate are vigorously stirred with an inert gas under reducing conditions. In so doing, further metallurgical use is advantageously made of the slag before the slag is discarded from the reactor. Such sulfur-bearing Ni concentrates are derived as an intermediate product from hydrometallurgy or from energy-intensive smelting during manufacture of ferronickel and Ni from raw sulfur-bearing Ni ores. The nickel content of the concentrate produced depends on the ore type and the process employed. A concentrate of the invention produced from precipitation of Ni—Fe sulfide from a smelting matte may analyze in wt. %: 16–28% Ni, 35–40% Fe, 30% S, <1% Cu, and <1% Co. A concentrate of the invention produced by a beneficiation process may analyze in wt. %: 9% Ni, 40% Fe, 30% S, 1% Cu, bal. $SiO_2$, $Al_2O_3$, CaO, and MgO. A preferred sulfur-bearing Ni concentrate of the invention is formed from Ni pentlandite ore having (Fe, Ni)$_9$S $_8$ as the predominant Ni species, with the concentrate preferably containing 5–35 wt. % S and 5–35 wt. % Ni.

Ni alloying units available from ores or concentrates preferably are recovered in a refining reactor in three stages. During an initial stage, Ni laterite ore preferably is partially dried to contain no more than 10% chemically bound water by being pre-heated in a heating kiln. Thereafter, the Ni laterite ore is hot-charged into an iron/slag bath mixture, wherein it is fully melted by vigorous stirring of the iron/slag bath mixture when injecting an oxygen-containing gas into the bath, preferably through means provided in the bottom of the reactor such as a tuyere. By an oxygen-containing gas is meant a gas containing at least one of air, pure oxygen, steam, Ar, $N_2$, and mixtures thereof. The solubility of Ni as NiO into the slag is practically nil so that Ni contained in the laterite ore is easily reduced to its metal phase. Ni recovery occurs fairly easily and quickly in the iron bath mixture. The stirring helps entrain and melt Ni laterite ore and slagging agents charged into the bath and provides oxygen for oxidation of the metalloid and carbon reductants in the bath mixture and to supply additional heat that may be needed during Stage I depending on the temperature of the charge materials. An oxygen gas may also be injected into the reactor through a top lance as well. Additional heat may be generated by the post-combustion of the CO off-gas within or above the iron/slag bath mixture. Upon melting of the Ni laterite ore and recovery of the Ni units to the ferrous bath, generally on the order of minutes after charging, Stage I is complete and all injection of the oxidizing gas is ceased.

Stage II then begins by injection of an inert stirring gas and the introduction of a sulfur-bearing Ni concentrate. Additional metalloid reductant, e.g., aluminum, silicon, or a combination thereof, may be added to the bath immediately after injection of the inert gas. In addition to helping to entrain and melt the sulfur-bearing Ni concentrate into the bath, the stirring gas assists in the very important role of lowering the prevailing oxygen partial pressure. This is accomplished by virtue of the low oxygen impurity level of the stirring gas itself, but more importantly, by promoting, on intimate mixing of the bath, the metalloid/oxygen equilibrium, which lowers the prevailing oxygen partial pressure even more. Simultaneously, the sulfur equilibrium or quasi-equilibrium between the slag and iron bath at the prevailing oxygen partial pressure is approached. By quasi-equilibrium is meant the molten iron-slag interfacial movement is sufficient to result in a dynamic balance between the slag and nickel-alloyed ferrous bath resulting in chemical equilibrium conditions being closely approached between the slag and metal phases. Upon lowering the prevailing oxygen partial pressure and facilitating the slag/metal sulfur equilibrium in this manner, maximum transfer of sulfur up to the slag sulfur solubility limit is ensured. Upon complete melting and desulfurization of the iron/slag bath mixture to the maximum extent, generally on the order of minutes, and upon deslagging, Stage II is complete.

During Stage III, the formed nickel-alloyed ferrous bath having been deslagged is then decarburized and refined to meet the alloy specification. The ferrous bath is decarburized by passing oxygen-containing gas through the stirring means, if necessary. Additional Ni and/or Cr units may be added to the bath such as by the addition of ferronickel, Ni shot, ferrochromium or other trim alloying metals to meet the final alloy specification.

During desulfurization and refining of the nickel-alloyed ferrous bath during Stage II of the invention, the stirring means has an important role. During the reduction period, a metalloid reductant preferably is added to the ferrous bath to lower the prevailing oxygen partial pressure to maximize sulfer transfer to the slag and at the same time to recover valuable Cr units if present originally in the bath. The injection of an inert stirring gas through the stirring means to mix intimately the slag and molten iron phases facilitates Cr recovery according to the dictates of the chrome slag/metal equilibrium.

Stages I, II and III all can be carried out in a melt shop equipped with a melting furnace such an EAF and a refining reactor. The stirring means in the reactor facilitates melting of the charge materials by promoting heat transfer processes within the bath mixture and facilitates the approach to chemical equilibrium by promoting intimate contact of the molten iron and slag.

A heat deficit is incurred when charging Ni laterite ore to the iron/slag bath mixture, owing not only to the relatively large amount of slag constituents per unit of Ni accompanying the ore, but also to the slagging agents mixed with the laterite ore needed to maintain slag composition and fluidity. In addition to oxidation of metalloids and carbon dissolved in the iron bath, this heat deficit may also be met by one or a combination of pre-heating charging materials and/or post-combustion of CO within or above the bath. While basing the process on carbon through post-combustion as the key heat source would appear to be the more economical route, basing the process on oxidation of an aluminum and/or a silicon metalloid can be economical as well, mainly by reducing melting time needed to generate heat by oxidation for a given specific gas flow rate. In the presence of aluminum and/or silicon in the bath, oxidation of these metalloids occurs generally at the expense of carbon, generating less CO for post-combustion per unit of oxygen per unit of time. As a result, the option of post-combustion does not have a significant impact on the production costs and may not be employed because the extra capital expense of a top lance may not be justified. The optimum role of post-combustion as a heat source, if any, depends on the production cost of extended melting time, the capital cost of a top lance and on the cost the metalloid relative to that for Ni units in ferronickel and scrap. In addition to aluminum and silicon, calcium carbide could be used as a metalloid reductant as well.

A much smaller heat deficit is incurred during Stage II on charging the sulfur-bearing Ni concentrate. This is due to a much smaller quantity of material per unit of Ni in the concentrate. Also, the desulfurization reaction occurring with the formation of CaS is mildly exothermic. The net result for Stage II is a small loss of temperature of the nickel-alloyed ferrous bath upon entering Stage III.

As will be explained in more detail below, only modest changes are necessary in the melting and/or refining practices used during the manufacture of the nickel-alloyed iron or steel to ensure maximum substitution of Ni from the concentrate for the Ni required for the grade customarily supplied from nickel-bearing scrap and ferronickel. The process of the present invention capitalizes on the presence of under-utilized slag from melting and dissolution of Ni laterite ore, with the slag being capable of removing and holding sulfur when the iron bath and slag are vigorously mixed by the inert gas through the stirring means under very reducing conditions in the presence of carbon and a metalloid such as aluminum, silicon or calcium carbide dissolved in the iron bath. The process of the invention exploits this potential desulfurization capacity as a means to lower further the cost of Ni units for producing a nickel-chromium-alloyed ferrous metal such as austenitic stainless steel. The slag sulfur solubility limit normally may not be reached during routine refining of stainless steels because the total sulfur load in the refining reactor originating from melting scrap in the EAF is typically low, hence the slag desulfurization capacity in the refining reactor may be under-utilized. Increased slag weight, increased levels of residual bath aluminum, silicon and carbon, and manipulation of slag composition can increase this degree of under-utilization.

The iron/slag bath mixture may be formed in a blast furnace or any other iron smelting furnace capable of providing liquid iron from solid iron-containing materials, including iron oxides. Alternatively, the iron bath may be formed by melting solid, iron-bearing scrap and the like, either within the refining reactor or preferably upstream of the reactor within a melting furnace, such as an EAF. Suitable solid, iron-bearing scrap for forming the iron/slag bath mixture include carbon steel scrap, nickel-alloyed steel scrap, stainless steel scrap, iron carbide, direct reduced iron (DRI) or hot-briquetted iron (HBI). In the case where the iron/slag bath mixture is produced by melting scrap in the EAF, the carbonaceous reductant and slagging agents may in part or totally be dissolved or melted into the iron bath while the iron bath is still in an EAF prior to being transferred to the reactor. Depending upon the furnace and type iron-bearing materials used, the initial iron/slag bath mixture may contain 0–20 wt. % Cr, 0.5 wt. % C up to carbon saturation and up to 3 wt. % of the metalloid required by Stage I.

All three stages of the invention now will be fully described in detail.

Stage I

During Stage I of the process of the invention, an iron/slag bath mixture containing a metalloid reductant and a carbon reductant, preferably at a temperature of at least 1500° C., is provided within a refining reactor. Ni laterite ore preferably is at least partially dried and introduced into the refining reactor at a temperature from room temperature up to the temperature limit of the pre-heating kiln and hot-charging system (about 1000° to 1200° C.). Slagging agents consisting mainly of CaO or $CaCO_2$ may also be pre-heated along with the Ni laterite ore. Similarly, a sulfur-bearing Ni concentrate may also be mixed with the Ni laterite ore and pre-heated, or simply charged later to the refining reactor during Stage II. When not employing a top lance for auxiliary oxygen injection in addition to the stirring means and for post-combustion capability, the ratio of $O_2$ to inert gas flowing through the stirring means preferably is between 2 and 4, and the total gas flow between 0.5 and 1.5 $NM^3$/min/MT. When employing a top lance with post-combustion capability, the total gas flow rate through the top lance and the stirring means preferably is between 0.5 and $4NM^3$/min/MT, more preferably at least 2 $NM^3$/min/MT, most preferably at least 2.5 $NM^3$/min/MT.

The percentage of the total gas flowing into the reactor through the stirring means preferably is between 30 and 100%. If the reactor is a CLU converter, the oxygen-containing gas may include steam, because upon reacting with carbon dissolved in the iron bath mixture $H_2$ formed from $H_2O$ reduces the partial pressure of CO and can be substituted mole for mole for Ar of the stirring gas. If a VOD, the reactor is operated much like a AOD, where oxygen is blown through a top lance and through a bottom tuyere mixed with the inert gas. Passing of oxygen through the lance serves two functions: to provide oxygen for oxidation of the metalloid and carbon reductants and oxygen for secondary, or post-combustion of CO and $H_2$ evolving from the bath. Both combustion reactions supply heat to the iron bath, with post-combustion generating over twice as much heat as decarburization per unit of oxygen consumed. The Post-Combustion Degree (PCD) is defined for the gas leaving the reactor as:

$$100\times(\%CO_2+\%H_2O)/(\%CO+\%CO_2+\%H_2+H_2O)$$

PCD preferably is less than 50%, more preferably between 20 and 30% when employed as a heat source. The total amount of oxygen gas as pure $O_2$ to be supplied to the iron bath is calculated based on heat and mass balances. The nozzle of the lance is designed to direct simultaneously a portion of the oxygen gas either into or over and above the bath via a wide jet specifically to effect post-combustion, and the remaining portion of the oxygen gas, into the bath via a compact jet specifically for oxidation of the metalloid and carbon reductants. The desired PCD of the waste gas is obtained by adjusting the shape of the nozzle affecting mainly the angle of the wide jet and its momentum, as well as the height of the nozzle within the reactor.

The portion of heat generated by post-combustion, at a given PCD, that is actually captured or transferred to the bath, excluding that lost to the freeboard of the reactor and to the evolving gas, is referred to as its Heat Transfer Efficiency (HTE). Significantly less heat is able to be captured or transferred into the bath than if the lance was submerged. As a result, HTE will be 50% or less if the lance is not submerged. This is in contrast to HTE achieved on the order of 80 to 90% when the lance is submerged. Submerging the lance necessitates the ample presence of solid carbon to prevent significant re-oxidation of Cr from the nickel-alloyed ferrous bath being lost to the slag if chromium is present and to prevent slag foaming. Stage I is continued, i.e., passing of the oxygen gas through the lance accompanied by bottom-injection of oxygen-containing stirring gas, until the Ni laterite ore and slagging agents are melted and the nickel-alloyed ferrous bath maintained at a temperature, preferably between 1500° C. and 1750° C. At this point all injection of oxygen through the top lance and through the stirring means is ceased.

Another important feature of the invention is controlling the composition of the slag basicity and ratios of $CaO/SiO_2$, $CaO/Al_2O_3$ and $MgO/Al_2O_3$. Slag basicity is defined as the weight ratio of $(\%CaO+\%MgO)/\%SiO_2$. This slag basicity during Stage I preferably should be at least 1.0, more preferably at least 1.5, most preferably at least 2.0. On the one hand, a higher slag basicity is known to be more compatible with many refractory linings in refining reactors. Also, a higher slag basicity promotes desulfurization, which is desired for Stage II. On the other hand, slag basicity increases slag volume per MT for a given amount of $SiO_2$ generated per MT of nickel-alloy ferrous bath. Slag basicity, however, should not exceed about 3.0 because the slag becomes too viscous at high concentrations of CaO and MgO due to increasing liquidus temperature, which may trap droplets of the alloy in the slag. $Al_2O_3$ present in the slag preferably should range from 10 to 25 wt. %. Likewise MgO should range between 10 and 20 wt. %. To effect maximum transfer of sulfur to the slag in Stage II, the ratios $CaO/SiO_2$, $CaO/Al_2O_3$ and $MgO/Al_2O_3$ should be at least 1.0, 0.5, and 0.2, respectively in the slag created in Stage I.

Another important feature of the invention is to control the specific slag weight as kg slag/MT metal. If the slag weight becomes excessive, effective mixing of the slag becomes a very difficult and the slag is not easily contained within the reactor due to slopping. The slag weight preferably should not exceed 400 kg/MT metal, more preferably should not exceed 300 and most preferably should not exceed 250. Generally, the slag is entrained into the bath during the vigorous mixing action of injection of the stirring gas through the bottom tuyere. As slag weight increases much above 250 kg/MT nickel-alloyed ferrous bath, a significant portion of the slag can coalesce into a slag layer, where the absence of mixing in the layer inhibits desulfurization kinetics and can trap metallic droplets of the alloy containing Ni units during Stage II. As a result, the slag weight can limit the amount of Ni laterite ore charged in Stage I.

Another important consideration of the invention is limiting the cobalt and copper contents of the Ni laterite ore. Ni laterite ore, together with sulfur-bearing Ni concentrate charged during Stage II, should not introduce Co and Cu units per MT of the nickel-alloyed ferrous bath in excess of that in the final alloy specification after subtracting for Co and Cu units already present in the initial iron charge.

Stage II

Slag desulfurization of sulfur from additions of sulfur-bearing Ni concentrate is the key feature during this Stage II. At the onset, with only inert gas injected through the stirring means, additional metalloid is charged into the bath to lower the prevailing oxygen partial pressure in the bath in accordance with the metalloid/oxygen bath equilibrium. If the metalloid is aluminum, the source of the aluminum may be a lower quality than that of more expensive aluminum shot, such as beverage container scrap. The melting time of this stage is relatively short, on the order of minutes, and is set by the time needed to achieve desulfurization up to the slag sulfur solubility limit. The process of desulfurization by slag is a kinetic phenomena that can involve the stirring rate intensity as a rate-limiting step. To this extent, the stirring rate intensity can affect the time needed for desulfurization.

The equilibrium slag/metal sulfur partition and the equilibrium slag sulfur solubility determine the maximum acceptable sulfur load in the system for a given bath sulfur specification and a given slag weight in a well-mixed refining reactor. By manipulation of the slag composition, slag/metal oxygen potential and temperature, the desulfurization capacity of the slag can be maximized for a given slag weight. This in turn allows the total sulfur load in the system to be maximized. With knowledge of the equilibrium slag/metal sulfur partition ratio and slag sulfur solubility, the maximum amount of sulfur-bearing Ni concentrate that can be charged into an bath mixture for a given sulfur content can be calculated.

Slag sulfur capacity, i.e., $C_s$, can be estimated using optical basicities of slag oxides as defined in the following equation:

$$\log C_s = [(22690 - 54640\Lambda)/T]\Lambda + 43.6\Lambda - 25.2,$$

where the slag optical basicity $\Lambda$ is calculated from a molar average of the optical basicity of each oxide $\Lambda_i$, i=oxides A, B ...:

$$\Lambda = X_A \Lambda_A + X_B \Lambda_B \cdots$$

and where $$X_i = \frac{\text{mole fraction of oxide} \times \text{number of oxygen atoms in oxide molecule}}{\Sigma \text{ mole fraction of oxide} \times \text{number of oxygen atoms in oxide molecules}}.$$

The most prevalent oxides in stainless steel slags are CaO, $SiO_2$, $Al_2O_3$, and MgO. Their optical basicities $\Lambda_i$ as determined from the above equation are:

$$\Lambda_{CaO}=1.0; \Lambda_{SiO_2}=0.48; \Lambda_{Al_2O_3}=0.61 \text{ and } \Lambda_{MgO}=0.78$$

These equations can be combined with standard thermodynamic equations for the sulfur gas/metal equilibrium and for expressing the effect of metal composition, to calculate the equilibrium distribution of sulfur between slag and steel in a refining reactor. The equilibrium slag/metal sulfur distribution ratio is defined as:

$$L_s \equiv \frac{(\%S)}{\%\underline{S}},$$

where (%S) is the wt. % sulfur in the slag and %$\underline{S}$ is the wt. % sulfur in the metal bath. This ratio can be calculated from the slag/metal sulfur equilibrium:

$$L_s = \frac{C_s f_s}{K_s p_{O_2}^{1/2}},$$

where $K_s$ is the equilibrium constant for the equilibrium $$\tfrac{1}{2}\underline{S}_2(g) = \underline{S} \Delta G^\circ = -32,280 + 5.6\, T;$$

$f_s$ is the activity coefficient of sulfur dissolved in the bath mixture to be calculated below (infinitely dilute, 1wt. % reference and standard states, respectively):

log $f_s$=−0.0280% $S$+0.11% $C$+0.063% $Si$−0.011% $Cr$+0% $Ni$−0.26% $Mn$−0.0084% $Cu$+0.01% $N$+0.0027% $Mo$+0.13% $B$;

$C_s$ is the slag sulfur capacity; and $P_{O_2}$ is the partial pressure of oxygen (atm).

The slag/metal system generally is not in equilibrium with the $P_{O_2}$ of the Ar gas. Instead, the $P_{O_2}$ is likely to be controlled by one of the oxides, i.e., CO or $Al_2O_3$. If the dissolved carbon-oxygen equilibrium is assumed to hold, then:

$$CO(g) = \underline{C} + 1/2 O_2(g)$$

$$\Delta G^\circ = 32,100 + 10.85T$$

$$p_{O_2}^{1/2} = \frac{\exp(-\Delta G^\circ/RT) p_{CO}}{f_C \%\underline{C}},$$

where log $f_c$=0.14% C −0.024% Cr+0.08% Si+0.046% S+0.012% Ni−0.12% Mn+0.11% N+0.016% Cu −0.0083 Mo %+0.24% B;

%$\underline{C}$ is wt. % C in the bath mixture and $p_{CO}$ is the partial pressure of CO in the refining reactor, (total pressure of 1 atm assumed), which can be calculated from the $O_2$/Ar impurity ratio of the inert gas of the stirring means:

$$p_{CO} = \frac{1}{1 + \frac{1}{2(O_2/Ar)}}$$

If the prevailing $p_{O_2}$ is controlled by the level of dissolved Al, then:

(3) $2\underline{Al} + 3/2 O_2(g) = Al_2O_3(S)$ $\Delta G^\circ = -435,960 - 3.75\, T \log T + 92.22\, T$ log $f_{Al}$=+0.045% Al−0.091% C−0.24% B+0.0056% Si+0.04% Cr −0.017% Ni, where $$p_{O_2}^{3/2} = \frac{\exp(-\Delta G^\circ/RT)}{(f_{Al} \% \underline{Al})^2}.$$

The equilibrium slag/metal sulfur partition ratio and the equilibrium slag sulfur solubility set the equilibrium, i.e., maximum, allowable total sulfur load in the slag/metal system for a given final bath sulfur specification for Stage II and slag weight. Increasing the sulfur load beyond this level will result in precipitation of CaS out of the slag phase as well as increase the bath sulfur level. Precipitation of CaS according to the following reactions is likely, and will, if precipitated in sufficient quantity, decrease the fluidity of the slag to the point of possibly compromising the deslagging procedure:

$3\underline{S}+3CaO(1)+2Al=3CaS(s)+Al_2O_3(1)$ $2\underline{S}+2CaO(1)+Si=2CaS(s)+SiO_2(1)$ While the slag/metal sulfur partition ratio can be calculated using the equations provided above, slag sulfur solubility is not presently calculated, but is determined by experimental observation in the laboratory or in pilot tests. Given the sulfur content of the sulfur-bearing Ni concentrate and the initial sulfur content of the iron bath, the total allowable sulfur load determines the maximum number of Ni units that can come from this sulfur-bearing Ni concentrate and still meet the bath sulfur specification for Stage II. This is illustrated by the following sulfur mass balance: (Basis: 1 metric tonne alloy)

TOTAL SULFUR OUT=TOTAL SULFUR IN

Slag Sulfur+Final Bath Sulfur=Concentrate Sulfur+Initial Bath Sulfur

SLAG $WT \times (\%S)+1000 \times \%S_{Final\ Bath}=X+1000 \times \%S_{Int.\ Bath}$, where $$\frac{(\%S)}{\%\underline{S}_{Final\ Bath}} \equiv L_S =$$

the equililbrium slag to metal sulfur distribution ratio, and $(\%S) \leq (\%S)_{max}$, where $(\%S)_{max}$ is the sulfur solubility limit in the slag.

The variable X represents the sulfur load from the sulfur-bearing Ni concentrate addition in units of kg S/tonne nickel-alloyed ferrous bath assuming essentially no loss of sulfur to the furnace atmosphere. For a slag basicity greater than 2.0 and a dissolved bath aluminum of at least 0.02 wt. %, $L_s$ greater than 200 is calculated.

The amount of sulfur-bearing Ni concentrate in units of kg/MT nickel-alloyed ferrous bath is X divided by the %S in the concentrate, and the maximum Ni units in units of kg/MT derived from the concentrate is the kg/MT of concentrate times it's Ni content; viz.

$$\text{Ni units (kg/MT)} = X \left( \frac{\%Ni}{\%S} \right)_{concentrate}$$

An important feature of the invention is controlling the composition of the slag, i.e., the basicity during Stage II. Slag basicity is defined as a weight ratio of (%CaO+%MgO)/(%SiO$_2$). This slag basicity should be at least 1.0, preferably at least 1.5 and more preferably at least 2.0. Slag basicity has a big effect on $L_s$ through $C_s$. A slag basicity much below 1.0 is detrimental to maximizing absorption of sulfur into the slag. Slag basicity should not exceed 3.0 because the slag becomes too viscous at high concentrations of CaO and MgO due to increasing liquidus temperatures. Similarly for good desulfurization, slag %Al$_2$O$_3$ should be low; the ratio CaO/Al$_2$O$_3$ should be at least 0.5, preferably 3.0 and most preferably 3.5.

Another important aspect of the invention includes the Ni laterite ore addition to include a slagging agent such as one or more of CaO, MgO, Al$_2$O$_3$, SiO$_2$ and fluorspar (CaF$_2$). It may be necessary to use a slagging agent to adjust the key slag composition ratios. A necessary slagging agent for this purpose is CaO. It also may be very desirable to use MgO as a slagging agent. This depends on the MgO content of the Ni laterite ore charged during Stage I. At least 10 wt. % MgO is preferred for the slag to be compatible with MgO in the refractory lining of the refining reactor. Preferably, the MgO in the slag should not exceed 20 wt. % because the increasing liquidus temperature due to higher MgO levels will make the slag viscous and difficult to mix with the metal bath. It also is desirable to add up to 10 wt. % CaF$_2$ to the slag because it can increase slag fluidity, assisting in solution of lime and sulfur. When Al$_2$O$_3$ is present in the slag, it preferably should not exceed about 25 wt. % because Al$_2$O$_3$ adversely affects $C_s$. It is desirable for the final slag to contain at least 10 wt. %, preferably at least 15 wt. % Al$_2$O$_3$ to promote slag fluidity.

Other compositions during the course of using the invention may be controlled as well. The inert gases for passage through the bottom tuyere for stirring or rinsing the iron bath mixture that may be used in the invention during the reduction period include Ar, N$_2$ or a mixture thereof. N$_2$ especially is preferred when less expensive than Ar, when its purity level is controlled to at least 99.997 vol. % and when Stage II is followed by decarburization and an Ar stir in Stage III. The reason for this extreme purity is because oxygen introduced with N$_2$ as low as 0.0005 vol. % represents a higher $p_{O2}$ than occurring in the refining reactor from the equilibrium of dissolved aluminum or carbon in the iron bath, i.e., Al/Al$_2$O$_3$ or C/CO. Also, the cobalt and copper contents of the concentrate should be controlled so as, together with the Co and Cu units introduced with the Ni laterite ore, to not introduce Co and Cu units per MT of bath in excess of that required by the final specification after subtracting for these units originating in the initial bath mixture.

Another important feature of Stage II of the invention is continued control of the specific slag weight as kg slag/MT nickel-alloyed ferrous bath. While it is preferable that the specific slag weight be as high as possible to maximize the sulfur load and hence the maximum number of Ni units obtained during Stages I and II, slag weight preferably should not exceed 400 kg/MT, more preferably should not exceed 300 and most preferably should not exceed 250. It is noted that the specification slag weight will increase marginally during Stage II from slag continents in the sulfur-bearing Ni concentrate and additional slagging agents needed to restore the slag basicity, and from Al$_2$O$_3$ and/or SiO$_2$ formed in the desulfurization and deoxidizing process. Generally, the slag is entrained into the iron bath during the vigorous mixing action of the stirring means. As slag weight increases much above 250 kg/MT in the nickel-alloyed ferrous bath, a significant portion of the slag can coalesce into a slag layer. In such a slag layer, the mixing effect of the stirring means diminishes, thereby inhibiting the desulfurization process and the approach to chemical equilibrium. Also, metallic droplets from the bath can be trapped in the slag layer, reducing yields of Ni and Cr. Deslagging marks the end of Stage II.

Stage III

By the end of Stage II, most of the sulfur-containing slag has been transferred from the reactor. A minor amount of retained slag may remain on the nickel-alloyed and possibly chromium-alloyed ferrous bath in the reactor with the ferrous bath containing residual sulfur, and the reductants. With a new addition of CaO and other slagging agents, the bath is suitable for routine refining to the final alloy specification. This procedure is carried out during Stage III, where the bath first undergoes decarburization under progressively decreasing ratios of O$_2$/Ar in the stirring means to lower carbon levels to near final carbon specification. This is followed by a reduction period, if Cr units were added upstream to recover valuable Cr units that were oxidized to the slag during decarburization in this stage. Since a refining slag is formed during Stage III, there is potential for further desulfurization. The maximum tolerable sulfur level in the nickel-alloyed ferrous bath leaving Stage II is set by the net desulfurization capacity of the new refining slag after correcting for the residual sulfur in any slag retained from Stage II. With the spout of the refining reactor intact, approximately 15 to 20 kg slag/MT metal typically remains after deslagging. For a slag sulfur level of 4 wt. % assumed for Stage II, the retained slag contributes up to about 1 kg S/MT metal that has to be removed during Stage III along with the sulfur in the hot metal leaving Stage II. An aluminum and/or silicon metalloid added to the reactor during refining will assist in desulfurization during this period by depressing the prevailing oxygen partial pressure in the bath thereby maximizing the slag/metal sulfur partition ratio L for the refining slag. If necessary and cost-effective, Stage III may include several deslaggings.

The present invention is desirable for supplying Ni alloying units for producing austenitic steels containing $\leq 0.11$ wt. % C, $\leq 2.0$ wt. % Al, $\leq 2.0$ wt. % Si, $\leq 9$ wt. % Mn, $\leq 0.03$ wt. % S, $\leq 26$ wt. % Cr, and $\leq 20$ wt. % Ni. The process is especially desirable for producing austenitic AISI 301–306, 12 SR, and 18 SR stainless steels. The final aluminum bath level for AISI 301–306 grades should not exceed 0.02 wt. % because of the deleterious effect of Al on weldability of the steel. Nickel is an important alloying metal contributing to the formation of austenite in stainless steel. These steels contain at least 2 wt. % Ni and preferably at least 4 wt. % Ni. Table II gives the chemistry specification in wt. % for the AISI 301–306 grade.

TABLE III

| % Ni | % Fe | % Cr | % $SiO_2$ | % MgO | % $Al_2O_3$ | % $H_2O$ |
|---|---|---|---|---|---|---|
| 2.5 | 18.2 | 1.1 | 37.4 | 22.3 | 2.0 | 7% |

After the Ni laterite ore was added, the iron/slag bath mixture was sampled and temperature taken every 3 to 5 minutes for the duration of Stage I. Because the Ni laterite ore was melted very quickly, the length of the melting time was determined instead by the time needed to raise or maintain temperature in the bath by injecting oxygen through the bottom stirring means at a fixed rate, rather than by the kinetics of melting the ore. After an acceptable bath temperature was reached, the oxygen flow was immediately terminated, and the flow of Ar stirring gas was increased. Generally, an aluminum addition to the iron bath was then made, followed by periodic additions of sulfur-bearing Ni concentrate of the wt. % composition given in Table IV.

TABLE IV

| % Ni | % Fe | % Co | % Cu | S | % $SiO_2$ | % MgO | % $H_2O$ |
|---|---|---|---|---|---|---|---|
| 20 | 25 | 0.5 | 0.1 | 28 | 5 | 9 | 7 |

The iron bath and slag were sampled and temperature taken every three to five minutes following a sulfur-bearing Ni concentrate addition until the slag was judged to have picked up its maximum sulfur content, at which point it became viscous or chunky, attributed to precipitation of CaS. Generally, the desulfurization process was also found

TABLE II

|  | S | C | Cr | Ni | Si | Mn | P | Mo | Cu | $N_2$ | Al | Co |
|---|---|---|---|---|---|---|---|---|---|---|---|---|
| Max | 0.025 | 0.05 | 18.0 | 6.25 | 0.7 | 2.75 | 0.04 | 0.5 | 0.5 | 0.16 | 0.02 | 0.5 |
| Min | 0.015 | 0.03 | 17.5 | 5.75 | 0.3 | 2.25 | low | low | — | 0.12 | — | — |
| Aim | 0.018 | 0.04 | 17.7 | 6.0 | 0.5 | 2.5 | low | low | 0.4 | 0.14 | — | — |

Pilot Trials Of The Invention

Molten iron was charged into a pre-heated, ½ tonne pilot reactor equipped with a commercial porous plug through which Ar and oxygen were flowing for stirring the bath mixture and oxidizing the metalloid and carbon reductants to generate heat. The iron was melted in a 550 kg capacity air induction furnace and tapped through a tundish into the reactor. The heats were tapped as hot as possible, typically 1700° to 1750° C., to overcome the relatively high thermal losses due to small heat size and large sensible heat requirement of the charge materials. With a D-Cast working lining and an alumina back-up lining in the pilot reactor, heat losses through the walls and open top amounted only to 9° C./min. The capability of the reactor used for the pilot trials of the invention was limited to only the bottom stirring means, thus not allowing the option of decarburization and post-combustion from blowing oxygen from a top lance.

Partially dried Ni laterite ore and slagging agents were charged cold into the reactor containing the molten iron mixture. Table III gives the wt. % composition of the Ni laterite ore.

to occur very quickly. The total melting time was instead determined by the number of additions of the sulfur-bearing Ni concentrate needed for the slag to reach its full desulfurization potential. Table V gives the key conditions and results for a series of six trials of the invention. It is noted that iron sulfide ($FeS_2$) rather than a sulfur-bearing Ni concentrate was actually added in some of the trials. Since the latter actually consists of essentially nickel and iron sulfide, there is little difference as to the behavior of sulfur during the trial originating from either source.

These trials show excellent Ni yields during Stage I for a variety of conditions. Even with a high slag weight (at about 200 kg/MT for Trial I compared to 50 to 100 kg/MT in other trials), a Ni yield of 83% was achieved, the decrease presumably due to entrapment of droplets of metal in slag, rather than to dust losses on charging.

With regard to Stage II, the trial results show a high Ni yield (Trials I and II) of the Ni units coming from the concentrate. Generally the slag sulfur levels were found to increase with increasing ratios of $CaO/SiO_2$ and $CaO/Al_2O_3$. Slag sulfur to hot metal sulfur ratios, $L_s$, also increased with ratios of $CaO/SiO_2$ and $CaO/Al_2O_3$ as well as bath %C.

TABLE V

| TRIAL NUMBER | I | II | III | IV | V | VI |
|---|---|---|---|---|---|---|
| PRE-TRIAL | | | | | | |
| TEMP IN AOD (C.) | 1693 | 1558 | 1699 | 1619 | 1680 | 1707 |
| BATH % C | 1.38% | 1.23% | 1.21% | 0.62% | 0.69% | 0.46% |
| BATH % Si | 2.28% | 2.30% | 2.31% | 2.32% | 2.30% | 2.25% |
| STAGE I | | | | | | |
| $O_2$/Ar | 3 | 3 | 0 | 1 | 2.5 | 2.5 |
| TOT NM3/MIN/MT | 0.63 | 0.63 | 0.42 | 0.52 | 0.55 | 0.55 |
| CONC TYPE | Ni Laterit | Ni Laterit | Ni Laterit | Ni Laterit | Ni Laterit | Ni Laterit |
| RATE (KG/MT) | 150 | 13 | 11.5 | 10 | 20.5 | 22.5 |
| SLAG VOL (KG/MT) | 203 | 26.5 | 31.5 | 58.5 | 90.5 | 93 |
| MELT TIME (MIN) | 17 | 6 | 3 | 7 | 12 | 6 |
| AVE TEMP (C.) | 1527 | 1545 | 1606 | 1540 | 1491 | 1519 |
| BATH % C | 1.12% | 1.25% | 1.20% | 1.47 | 1.60% | 0.45% |
| BATH % Si | 1.57% | 2.28% | 1.86% | 2.79 | 2.85% | 2.27% |
| BATH % Ni | 0.31% | 0.04% | 0.04% | 0.04 | 0.05% | 0.05% |
| SLAG $CaO/SIO_2$ | 1 | 1.5 | 1.2 | 1.2 | 2 | 2.1 |
| SLAG $CaO/AL_2O_3$ | 1 | 0.6 | 0.8 | 0.7 | 1.4 | 1.5 |
| SLAG $MgO/AL_2O_3$ | 0.6 | 0.3 | 0.3 | 0.8 | 0.5 | 0.5 |
| Ni YIELD (%) | 83% | 100% | 100% | 100% | 100% | 100% |
| STAGE II | | | | | | |
| NM3 AR/MIN/MT | XXX | 0.42 | 0.42 | 0.26 | 0.42 | 0.42 |
| CONC TYPE | XXX | Ni CONC | Ni CONC | $FeS_2$ | $FeS_2$ | $FeS_2$ |
| RATE (KG/MT) | XXX | 25 | 16.5 | 10 | 21 | 16.5 |
| MELT TIME (MIN) | XXX | 15 | 11 | 6 | 7 | 8 |
| AVG TEMP (C.) | XXX | 1534 | 1572 | 1522 | 1531 | 1562 |
| SLAG $CAO/SIO_2$ | XXX | 2 | 2.1 | 1.4 | 2.3 | 4.8 |
| SLAG $CAO/AL_2O_3$ | XXX | 0.4 | 0.5 | 0.6 | 0.8 | 0.8 |
| SLAG $MGO/AL_2O_3$ | XXX | 0.2 | 0.2 | 0.2 | 0.3 | 0.3 |
| BATH % C | XXX | 1.17% | 1.14% | 1.45 | 1.59% | 0.47% |
| BATH % S | XXX | 0.40% | 0.20% | 0.04% | 0.08% | 0.16% |
| BATH % SI | XXX | 2.42% | 2.17% | 2.59% | 3.02% | 2.95% |
| BATH % AL | XXX | 0.57% | 0.21% | 0.01% | 0.05% | 0.11% |
| BATH % CR | XXX | 0.02% | 0.02% | 0.03% | 0.08% | 0.03% |
| BATH % NI | XXX | 0.53% | 0.32% | 0.04% | 0.05% | 0.05% |
| MAX SLAG % S | XXX | 3.90% | 2.40% | 2.50% | 5.70% | 4.30% |
| (SLAG % S)/(HM % S) | XXX | 10 | 12 | 63 | 70 | 27 |
| SLAG COND | XXX | CHUNKY | VISCOUS | FLUID | CHUNKY | FLUID |
| N I YIELD (%) | XXX | 100% | 88% | XXX | XXX | XXX |

Examples For Commercial Operation Of The Invention

The present invention may be used to produce a variety of stainless steels, where a range of Ni units, preferably at least 10% of the Ni units of the steel, can come directly from Ni laterite ore and sulfur-bearing Ni concentrate. The balance of Ni units may come from nickel-containing steel scrap melted up-stream and possibly ferronickel added either upstream or downstream during Stage III. The number of Ni units derived directly from the ore and concentrate depends on the process conditions chosen in the invention.

Eight examples are now presented to illustrate commercial applications proposed for the invention. Table VI gives the operating conditions and consequences of Stages I and II of the invention, where key parameters of the process are varied systematically. It is noted that application of the invention is not limited to the range of parameters selected in Table VI. For example, the initial temperature of the iron/slag mixture can be a parameter, although for all of the examples given in Table VI this is constant. The invention may be employed to obtain higher nickel contents in the nickel-alloyed ferrous bath solely from the Ni ore and sulfur-bearing Ni concentrate, but this will entail higher slag weights, depending on mixing conditions, and will eventually increase melting time, decrease Ni yields and desulfurization efficiency. An alternative, which may be more economical, depending upon the production cost savings per Ni unit substituted by the invention and the cost of extended cycle time, is multiple deslaggings. The differences in Ni content between what is produced during Stages I and II of the invention and what is required by the final alloy specification, is adjusted either upstream or downstream by ferronickel and/or Ni-bearing scrap addition.

TABLE VI

| EXAMPLE DESCRIPTION | I BASE | II Pre-Heat | III L | IV SLAG % S | V SLAG VOL | VI time | VII time/PCD | VIII C/S |
|---|---|---|---|---|---|---|---|---|
| | | | | STAGE I | | | | |
| PARAMETERS (STAGE I) | | | | | | | | |
| REDUCTANTS | C + AL | C + AL + SI | C + AL | C + AL | C + AL | C + AL | C + AL | C + AL |

TABLE VI-continued

| EXAMPLE DESCRIPTION | I BASE | II Pre-Heat | III L | IV SLAG % S | V SLAG VOL | VI time | VII time/PCD | VIII C/S |
|---|---|---|---|---|---|---|---|---|
| OXYGEN UTILIZATION | | | | | | | | |
| BY C | 42% | 0% | 42% | 42% | 38% | 69% | 95% | 41% |
| BY AL | 58% | 75% | 58% | 58% | 62% | 31% | 5% | 59% |
| CONCENTRATE | | | | | | | | |
| SOURCE | LATERITE | LATERITE | LATERITE | LATERITE | LATERITE | LATERITE | LATERITE | LATERITE |
| RATE (KG/MT HM) | 171 | 126 | 171 | 171 | 206 | 172 | 172 | 148 |
| CHARGE T (C) | 1000 | 25 | 1000 | 1000 | 1000 | 1000 | 1000 | 1000 |
| HM T IN AOD (C) | 1600 | 1600 | 1600 | 1600 | 1600 | 1600 | 1600 | 1600 |
| $O_2$/AR | 4 | 4 | 4 | 4 | 4 | 4 | 9 | 4 |
| GAS RATE ($NM^3$/MIN/MT) | 0.8 | 0.8 | 0.8 | 0.8 | 0.8 | 0.8 | 1.6 | 0.8 |
| MELT TIME (MIN) | 10 | 10 | 10 | 10 | 10 | 30 | 30 | 10 |
| MELT TEMP (C.) | 1600 | 1600 | 1600 | 1600 | 1600 | 1600 | 1600 | 1600 |
| NI YIELD | 90% | 90% | 90% | 90% | 90% | 90% | 90% | 90% |
| SLAG | | | | | | | | |
| $CAO/SIO_2$ | 1.5 | 1.5 | 1.5 | 1.5 | 1.5 | 1.5 | 1.5 | 2 |
| % CAO | 41.60% | 41.70% | 41.60% | 41.60% | 41.60% | 42.00% | 42.10% | 48.30% |
| % $SIO_2$ | 27.70% | 27.80% | 27.70% | 27.70% | 27.70% | 28.00% | 28.10% | 24.20% |
| % $AL_2O_3$ | 14.20% | 16.60% | 14.20% | 14.20% | 14.20% | 13.40% | 13.00% | 13.20% |
| % MGO | 16.50% | 13.90% | 16.50% | 16.50% | 16.50% | 16.70% | 16.80% | 14.20% |
| PCD | 0% | 0% | 0% | 0% | 0% | 0% | 25% | 0% |
| HTE | 0% | 0% | 0% | 0% | 0% | 0% | 50% | 0% |
| RESULTS (STAGE I) | | | | | | | | |
| % MELT BATH NI | 0.41% | 0.30% | 0.41% | 0.41% | 0.49% | 0.41% | 0.41% | 0.35% |
| SLAG VOLUME | | | | | | | | |
| (KG/MT) | 240 | 213 | 240 | 240 | 288 | 239 | 239 | 239 |
| AL CONSUMP (KG/MT) | 16.7 | 17.8 | 16.7 | 16.7 | 20.3 | 15.7 | 3.5 | 15.4 |
| SI CONSUMP (KG/MT) | 0 | 4.8 | 0 | 0 | 0 | 0 | 0 | 0 |

STAGE II

| | | | | | | | | |
|---|---|---|---|---|---|---|---|---|
| PARAMETERS (STAGE II) | | | | | | | | |
| CONCENTRATE | | | | | | | | |
| SOURCE | PENTLAN | PENTLAN | PENTLAN | PENTLAN | PENTLAN | PENTLAN | PENTLAN | PENTLAN |
| RATE (KG/MT) | 23.5 | 21 | 24.7 | 41.1 | 28.1 | 23.4 | 23.4 | 23.5 |
| CHARGE T (C) | 25 | 25 | 25 | 25 | 25 | 25 | 25 | 25 |
| AL CHARGE (KG/MT) | 5 | 5 | 5 | 5 | 5 | 5 | 5 | 5 |
| INITIAL BATH TEMP (C.) | 1600 | 1600 | 1600 | 1600 | 1600 | 1600 | 1600 | 1600 |
| $O_2$/AR | 0 | 0 | 0 | 0 | 0 | 0 | 0 | 0 |
| GAS RATE ($NM^3$/MIN/MT) | 0.8 | 0.8 | 0.8 | 0.8 | 0.8 | 0.8 | 0.8 | 0.8 |
| MELT TIME (MIN) | 10 | 10 | 10 | 10 | 10 | 10 | 10 | 10 |
| NI YIELD | 90% | 90% | 90% | 90% | 90% | 90% | 90% | 90% |
| SLAG | | | | | | | | |
| % CAO | 40.30% | 40.50% | 40.50% | 39.40% | 40.30% | 40.70% | 40.80% | 46.90% |
| % $SIO_2$ | 26.90% | 27.00% | 27.00% | 26.30% | 26.90% | 27.10% | 27.20% | 23.40% |
| % $AL_2O_3$ | 16.30% | 18.60% | 16.50% | 17.80% | 16.30% | 15.50% | 15.20% | 15.30% |
| % MGO | 16.50% | 14.00% | 16.60% | 16.50% | 16.50% | 16.70% | 16.70% | 14.50% |
| SLAG VOLUME (KG/MT) | 250 | 223 | 250 | 258 | 300 | 250 | 249 | 250 |
| SULFUR CONTROL | | | | | | | | |
| SLAG S | 3.00% | 3.00% | 3.00% | 5.00% | 3.00% | 3.00% | 3.00% | 3.00% |
| L = % SLAG S/% HM S | 70.00 | 70.00 | 50.00 | 70.00 | 70.00 | 70.00 | 70.00 | 70.00 |
| RESULTS (STAGE II) | | | | | | | | |
| MELT BATH NI | 0.54% | 0.48% | 0.56% | 0.93% | 0.64% | 0.53% | 0.53% | 0.54% |
| MELT BATH S | 0.04% | 0.04% | 0.09% | 0.07% | 0.05% | 0.04% | 0.04% | 0.04% |
| EFF BATH S* | 0.09% | 0.09% | 0.13% | 0.15% | 0.09% | 0.09% | 0.09% | 0.09% |
| FINAL BATH TEMP (C.) | 1560 | 1558 | 1561 | 1534 | 1564 | 1561 | 1551 | 1559 |
| RESULTS (STAGES I & II) | | | | | | | | |
| NI TOTAL | 0.94% | 0.78% | 0.96% | 1.32% | 1.12% | 0.94% | 0.94% | 0.88% |
| DELTA CYCLE TIME (MIN) | 20 | 20 | 20 | 20 | 20 | 40 | 40 | 20 |

*Includes sulfur from the residual slag.

EXAMPLES I AND II

Example I is taken as the base example to which the other examples are compared. In Example II, the parameter at issue is pre-heat temperature, which is lowered. In Examples I and II, the Ni laterite ore is considered to be completely free of moisture with nearly all chemically bound water being liberated when pre-heated to between 500°–600° C. Example II corresponds to where the Ni laterite ore was completely dried in this manner, but charged at room temperature due to an inability to be hot-charged. It is noted charging partially dried ore still containing about 7 wt. % chemically bound water only marginally affects the total heat balance. For these examples, a Ni yield during Stage I of 90% is assumed, based on the pilot trial results. Also in all three cases, aluminum is the key metalloid reductant. When aluminum scrap costs about the same as silicon in ferrosilicon fines, aluminum is chosen over silicon for three direct benefits: the need for $Al_2O_3$ in the slag owing to the relative lack of $Al_2O_3$ in the Ni laterite and sulfur-bearing Ni concentrate; a higher heat of oxidation over silicon; and, no need for slagging agents such as CaO to maintain slag basicity that would additionally increase slag weight. In fact, the use of aluminum for these three reasons illustrates a key synergism in the invention that can result in significant cost savings.

The lowering of pre-heat temperature from 1000° C. to 25° C. would result in a modest decrease in Ni units from Ni laterite ore for equivalent slag weight. Since slag weight is the same for both cases, the amount of Ni units from the concentrate during Stage II is the same. Thus, the final total Ni content from Stage I and II is about the same. However, more aluminum and nickel are used as pre-heat temperature is decreased, which will impact the production cost savings per unit of Ni.

EXAMPLES III, IV AND V

In Example III, slag S to HM S ratio, $L_s$, is investigated, whereas in Example IV, only percent slag sulfur is investigated as a parameter, both affecting only Stage II. Stage I has exactly the same conditions as for the base case, Example I. In Example III, percent slag sulfur is held constant, so increasing $L_s$ has the only effect of decreasing final bath %S. In Example IV, since for a given slag weight, percent slag sulfur directly controls the amount of concentrate charged, the number of Ni units produced during Stage II is directly proportional to percent slag sulfur. The final bath temperature decreases slightly as less sulfur is absorbed into the slag. Permitting slag weight to increase during Stage I in Example V, as a result of charging more Ni laterite ore, increases directly the number of Ni units per MT alloyed bath acquired in both Stage I and Stage II for equivalent percent slag sulfur and ratio $L_s$. Melting time for Stage I is kept constant, so the bigger heat sink due to expanding the slag weight has to be made up by burning more aluminum (or silicon) over carbon. The consumption of aluminum is increased over Example I by about 20% but the total number of Ni units is increased also by about 20% to 1.12 wt. % from 0.94 wt. %. Since Al costs considerably less than Ni per equivalent weight, the economic incentive for increased slag weight is strong.

EXAMPLES VI AND VII

Extended melting time with or without accompanying post-combustion capability in combination with a higher specific gas flow rate for Stage I are the key parameters at issue in Examples VI and VII. Slag weight and composition, despite increased melting time, are kept constant and equal to that for Example I. As a result, carbon participates to a greater extent to be oxidized to supply heat to the iron bath. While the final result is approximately the same number of Ni units produced per MT of nickel-alloyed ferrous bath as for Example I, the production costs may be different. This is due to the use of less expensive carbon over aluminum but increased costs due to the need to charge $Al_2O_3$ to maintain slag composition, and the cost of the additional cycle time. In addition to the production cost, another cost issue is the capital cost for the top lance.

EXAMPLE VIII

The slag ratio $CaO/SiO_2$ is increased from 1.5 in Example I to 2.0 in Example VIII. This is accomplished by charging more CaO with the Ni laterite ore. This change negatively impacts the heat balance because of the added heat requirement to heat the additional CaO from the pre-heat temperature to the melting temperature. As a result, fewer Ni units are produced during Stage I. During Stage II, however, the same number of Ni units are produced as in Example I, since the specific slag weights are equivalent.

At the completion of Stage II in Examples I–VIII, the nickel-alloyed ferrous bath could be decarburized to final specification in Stage III by the oxygen-containing gas. Following a reduction period where the oxygen-containing gas then is ceased, a metalloid is added to the ferrous bath and Ar is injected through the stirring means to transfer residual sulfur to the slag leaving no more than 0.03 wt. % sulfur in the ferrous bath.

It will be understood various modifications may be made to the invention without departing from the spirit and scope of it. Therefore, the limits of the invention should be determined from the appended claims.

What is claimed is:

1. A method of producing a nickel-alloyed ferrous bath in a refining reactor, comprising:
   providing an iron/slag bath mixture containing a dissolved metalloid and carbon within the reactor,
   the basicity of the slag/bath mixture maintained between 1.0–3.0,
   charging Ni laterite ore into the bath mixture,
   injecting an oxygen-containing gas into the bath mixture to oxidize the metalloid and the carbon, and to stir the bath mixture until the Ni laterite ore is melted thereby forming a nickel-alloyed ferrous bath,
   discharging the slag from the ferrous bath, and
   injecting the oxygen-containing gas, if necessary, until the ferrous bath is decarburized to a final carbon specification.

2. The method of claim 1 including the additional step of charging a sulfur-bearing Ni concentrate to the ferrous bath.

3. The method of claim 1 including the additional step of charging a sulfur-bearing Ni concentrate with the Ni laterite ore to the bath mixture.

4. The method of claim 1 wherein the Ni laterite ore is partially dried to contain no more than 10% chemically bound water.

5. The method of claim 4 wherein the Ni laterite ore is pre-heated.

6. The method of claim 3 wherein the sulfur-bearing Ni concentrate is pre-heated.

7. The method of claim 1 wherein the ferrous bath is deslagged multiple times prior to ceasing injecting the oxygen-containing gas.

8. The method of claim 1 wherein the metalloid is from the group consisting of aluminum, silicon and calcium carbide.

9. The method of claim 2 including the additional steps of:

ceasing injecting the oxygen-containing gas and injecting an inert gas into the ferrous bath, and charging another metalloid to desulfurize the ferrous bath.

10. The method of claim 9 wherein the ferrous bath is deslagged multiple times after desulfurization is complete.

11. The method of claim 1 wherein the reactor includes means for bottom-stirring and the additional step of:

passing the oxygen-containing gas through the stirring means.

12. The method of claim 2 wherein the reactor includes means for bottom-stirring and the additional step of:

passing an inert gas through the stirring means after ceasing injecting the oxygen-containing gas through the stirring means to continue mixing the bath mixture until the sulfur-bearing Ni concentrate is melted and sulfur is transferred to the slag.

13. The method of claim 1 wherein the reactor includes means for top-blowing of oxygen and means for bottom-stirring the bath mixture and the additional steps of:

injecting oxygen gas through the blowing means into the bath mixture, a portion of the oxygen gas being discharged above or into the bath mixture to effect post-combustion of CO and $H_2$ and the remainder of the oxygen gas being injected into the bath mixture to effect oxidation of the carbon to CO and the metalloid to oxide.

injecting the oxygen-containing gas through the bottom-stirring means.

14. The method of claim 13 wherein the total flow of oxygen gas passing through the blowing means and oxygen-containing gas passing through the stirring means is 0.5 to 4 $NM^3$/min/MT.

15. The method of claim 13 wherein the oxygen gas passing through the blowing means is essentially pure oxygen and the oxygen-containing gas injected through the stirring means has an oxygen to inert molar gas ratio of no greater than 4.

16. The method of claim 13 wherein the initial molar ratio of oxygen to inert gas in the stirring gas is no greater than 4 and is decreased to zero after melting the Ni laterite ore.

17. The method of claim 13 wherein the temperature of the bath mixture prior to injecting oxygen is 1500°–1750° C.

18. The method of claim 1 wherein the bath mixture contains 0 to 20 wt. % Cr, 0.5 wt. % C up to carbon saturation and up to 3 wt. % of the metalloid.

19. The method of claim 1 wherein the slag ratios $CaO/SiO_2$, $CaO/Al_2O_3$, and $MgO/Al_2O_3$ in the bath mixture are at least 1.0, 0.5, and 0.2 respectively.

20. The method of claim 1 wherein the slag weight of the bath mixture does not exceed 400 kg/MT.

21. The method of claim 2 wherein at least 10% of the Ni units in the ferrous bath are derived from the Ni laterite ore and the sulfur-bearing Ni concentrate.

22. The method of claim 1 wherein the ferrous bath is stainless steel containing $\leq 2.0$ wt. % Al, $\leq 2.0$ wt. % Si, $\leq 0.03$ wt. % S, $\leq 26$ wt. % Cr, and $\leq 10$ wt. % Ni.

23. A method of producing a nickel-alloyed ferrous bath in a refining reactor, comprising:

providing an iron/slag bath mixture containing a dissolved metalloid and carbon within the reactor, the basicity of the slag/bath mixture maintained between 1.0–3.0, the reactor including means for bottom-stirring the bath mixture, charging Ni laterite ore into the bath mixture, injecting an oxygen-containing gas into the bath mixture through the stirring means to oxidize the metalloid and the carbon, and to stir the bath mixture until the Ni laterite ore is melted thereby forming a nickel-alloyed ferrous bath, injecting an inert gas through the stirring means, charging a sulfur-bearing Ni concentrate and another metalloid into the ferrous bath whereby the inert gas injection is continued until sulfur is transferred to the slag from the ferrous bath, discharging the sulfur-containing slag from the reactor, and injecting the oxygen-containing gas, if necessary, until the ferrous bath is decarburized to a final carbon specification.

24. A method of producing a nickel-alloyed ferrous bath in a refining reactor, comprising:

providing an iron/slag bath mixture containing a dissolved metalloid and carbon within the reactor, the basicity of the slag/bath mixture maintained between 1.0–3.0, the reactor including means for bottom-stirring the bath mixture and means for top-blowing of oxygen, charging Ni laterite ore into the bath mixture, injecting oxygen gas through the blowing means and oxygen-containing gas through the stirring means to oxidize the metalloid and the carbon, and to vigorously stir the bath mixture until the Ni laterite ore is melted thereby forming a nickel-alloyed ferrous bath, a portion of the oxygen gas being discharged above or into the bath mixture to effect post-combustion of CO and $H_2$ and the remainder of the oxygen gas being injected into the bath mixture to effect the oxidation of the carbon and the metalloid, injecting an inert gas through the stirring means, charging a sulfur-bearing Ni concentrate and another metalloid into the ferrous bath whereby the inert gas is continued until sulfur is transferred to the slag from the ferrous bath, discharging the sulfur-containing slag from the reactor, and injecting the oxygen-containing gas through the stirring means, if necessary, until the ferrous bath is decarburized to a final carbon specification.

25. A method of producing a nickel-chromium-alloyed ferrous bath in a refining reactor, comprising:

providing a chromium-alloyed iron/slag bath mixture containing a dissolved metalloid and carbon within the reactor, the metalloid from the group consisting of aluminum, silicon and calcium carbide, the reactor including means for top-blowing the bath mixture and means for bottom-stirring the bath mixture, charging Ni laterite ore into the bath mixture, injecting oxygen gas through the blowing means and oxygen-containing gas through the stirring means to oxidize the metalloid and the carbon, and to vigorously stir the bath mixture until the Ni laterite ore is melted thereby forming a chromium-nickel-alloyed ferrous bath, a portion of the oxygen gas being discharged above or into the bath mixture to effect post-combustion of CO and $H_2$ and the remainder of the oxygen gas being injected into the bath mixture to effect the oxidation of the carbon and the metalloid, injecting an inert gas through the stirring means, charging a sulfur-bearing Ni concentrate and aluminum into the ferrous bath whereby the inert gas is continued until sulfur is transferred to the slag from the ferrous bath, discharging the sulfur-containing slag from the reactor, and injecting the oxygen-containing gas through the stirring means, if necessary, to decarburize the ferrous bath until reaching a final carbon specification, and charging additional of the metalloid and injecting the inert gas through the stirring means into the ferrous bath to recover Cr from the slag and to transfer sulfur to the slag wherein the ferrous bath contains $\leq 0.03$ wt. % S.

26. A method of producing a nickel-alloyed ferrous bath in a refining reactor, comprising:

providing an iron/slag bath mixture containing a dissolved metalloid and carbon within the reactor, charging Ni laterite ore and a sulfur-bearing Ni concentrate containing 10–35 wt. % Ni into the bath mixture, injecting an oxygen-containing gas into the bath mixture to oxidize the metalloid and the carbon, and to stir the bath mixture until the Ni laterite ore and the Ni concentrate are melted thereby forming a nickel-alloyed ferrous bath, charging another metalloid to desulfurize the ferrous bath, ceasing injecting the oxygen-containing gas and injecting an inert gas into the ferrous bath, discharging the sulfur-containing slag from the ferrous bath, and injecting the oxygen-containing gas, if necessary, until the ferrous bath is decarburized to a final carbon specification.

27. A method of producing a nickel-alloyed ferrous bath in a refining reactor, comprising:

providing an iron/slag bath mixture containing a dissolved metalloid and carbon within the reactor, charging Ni laterite ore and a sulfur-bearing Ni concentrate into the bath mixture, injecting an oxygen-containing gas into the bath mixture to oxidize the metalloid and the carbon, and to stir the bath mixture until the Ni laterite ore is melted thereby forming a nickel-alloyed ferrous bath, ceasing injecting the oxygen-containing gas and injecting an inert gas into the ferrous bath, charging aluminum to desulfurize the ferrous bath, discharging the slag from the ferrous bath, and injecting the oxygen-containing gas, if necessary, until the ferrous bath is decarburized to a final carbon specification.

28. A method of producing a nickel-alloyed ferrous bath in a refining reactor, comprising:

providing an iron/slag bath mixture containing a dissolved metalloid and carbon within the reactor, the reactor including means for top-blowing of oxygen and means for bottom-stirring the iron/slag bath mixture, charging Ni laterite ore into the bath mixture, injecting oxygen gas through the blowing means and oxygen-containing gas through the stirring means to oxidize the metalloid and the carbon, and to vigorously stir the bath mixture until the Ni laterite ore is melted thereby forming a nickel-alloyed ferrous bath, a portion of the oxygen gas being discharged above or into the bath mixture to effect post-combustion of CO and $H_2$ and the remainder of the oxygen gas being injected into the bath mixture to effect the oxidation of the carbon and the metalloid wherein the total flow of oxygen gas passing through the blowing means and the oxygen-containing gas passing through the stirring means is at least 0.4 $NM^3/min/MT$, discharging the slag from the ferrous bath thereby forming a nickel-alloyed ferrous bath, and injecting the oxygen-containing gas, if necessary, until the ferrous bath is decarburized to a final carbon specification.

29. A method of producing a nickel-alloyed ferrous bath in a refining reactor, comprising:

providing an iron/slag bath mixture containing a dissolved metalloid and carbon within the reactor, the reactor including means for top-blowing of oxygen and means for bottom-stirring the iron/slag bath mixture, charging Ni laterite ore into the bath mixture, injecting oxygen gas through the blowing means and oxygen-containing gas through the stirring means to oxidize the metalloid and the carbon, and to vigorously stir the bath mixture until the Ni laterite ore is melted thereby forming a nickel-alloyed ferrous bath, a portion of the oxygen gas being discharged above or into the bath mixture to effect post-combustion of CO and $H_2$ and the remainder of the oxygen gas being injected into the bath mixture to effect the oxidation of the carbon and the metalloid wherein at least 30% of the total gas flow into the bath mixture is through the stirring means, discharging the slag from the ferrous bath thereby forming a nickel-alloyed ferrous bath, and injecting the oxygen-containing gas, if necessary, until the ferrous bath is decarburized to a final carbon specification.

30. A method of producing a nickel-alloyed ferrous bath in a refining reactor, comprising:

providing an iron/slag bath mixture containing a dissolved metalloid and carbon within the reactor, the reactor including means for top-blowing of oxygen and means for bottom-stirring the iron/slag bath mixture, charging Ni laterite ore into the bath mixture, injecting oxygen gas through the blowing means and oxygen-containing gas through the stirring means to oxidize the metalloid and the carbon, and to vigorously stir the bath mixture until the Ni laterite ore is melted thereby forming a nickel-alloyed ferrous bath, a portion of the oxygen gas being discharged above or into the bath mixture to effect 20–50% post-combustion of CO and $H_2$ and the remainder of the oxygen gas being injected into the bath mixture to effect the oxidation of the carbon and the metalloid, discharging the slag from the ferrous bath, and injecting the oxygen-containing gas, if necessary, until the ferrous bath is decarburized to a final carbon specification.

31. A method of producing a nickel-alloyed ferrous bath in a refining reactor, comprising:

provlding an iron/slag bath mixture containing a dissolved metalloid and carbon within the reactor, charging Ni laterite ore into the bath mixture, injecting an oxygen-containing gas into the bath mixture to oxidize the metalloid and the carbon, and to stir the bath mixture until the Ni laterite ore is melted thereby forming a nickel-alloyed ferrous bath, the slag containing CaO, $SiO_2$, $Al_2O_3$ and MgO wherein the ratios of $CaO/SiO_2$, $CaO/Al_2O_3$ and $MgO/Al_2O_3$ are at least 1.0, 0.5, and 0.2 respectively with the $Al_2O_3$ being at least 10 wt. % in the slag, discharging the slag from the ferrous bath, and injecting the oxygen-containing gas, if necessary, until the ferrous bath is decarburized to a final carbon specification.

\* \* \* \* \*